Oct. 17, 1967 F. J. REZNICK ETAL 3,347,771

LEAD-TIN ALLOY PLATING FIXTURE FOR SILICON

Filed Jan. 25, 1965 2 Sheets-Sheet 1

INVENTORS
JAMES A. NODDINGS
BY FRANK J. REZNICK

James M. Nickels

ATTORNEY

INVENTORS
JAMES A. NODDINGS
FRANK J. REZNICK
BY [signature]
ATTORNEY

United States Patent Office 3,347,771
Patented Oct. 17, 1967

3,347,771
LEAD-TIN ALLOY PLATING FIXTURE FOR SILICON

Frank Joseph Reznick, Neptune, and James A. Noddings, Matawan, N.J., assignors to The Bendix Corporation, Eatontown, N.J., a corporation of Delaware
Filed Jan. 25, 1965, Ser. No. 427,675
8 Claims. (Cl. 204—297)

The present invention relates to semiconductor devices and more particularly to a fixture for holding semiconductor wafers for plating.

One method of forming solder contacts on semiconductor wafers is by means of lead-tin alloy electro-deposition. However, due to the physical characteristics of the semiconductor wafer it is difficult to provide suitable means for holding without doing physical damage to the wafers.

The present invention provides means for holding numbers of semiconductor wafers to plate them in a uniform and reliable way without causing any physical damage. Further, it can be utilized for other applications such, for example, as cleaning, stripping, handling, etc.

It is an object of the invention to provide a novel holding fixture.

Another object of the invention is to provide improved holding means for semiconductor wafers.

Another object of the invention is to provide an improved fixture for use in plating semiconductor wafers.

Another object of the invention is to provide a novel fixture for holding silicon wafers.

The above and other objects and features of the invention will appear more fully hereinafter from a consideration of the following description taken in connection with the accompanying drawing wherein one embodiment is illustrated by way of example.

Figure 1:
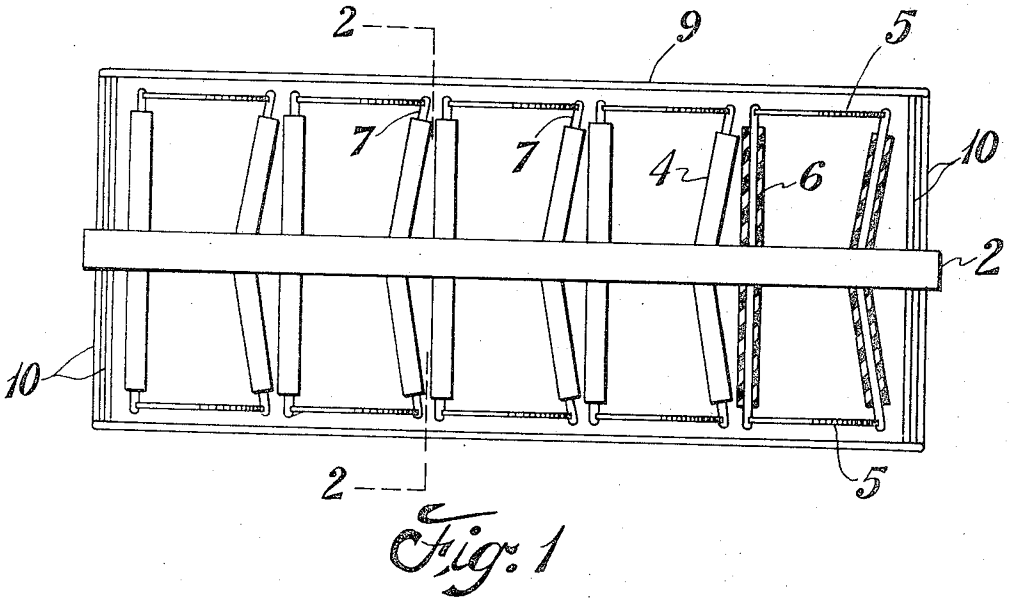
FIGURE 1 is a side view of a fixture embodying the invention.
Figure 2:
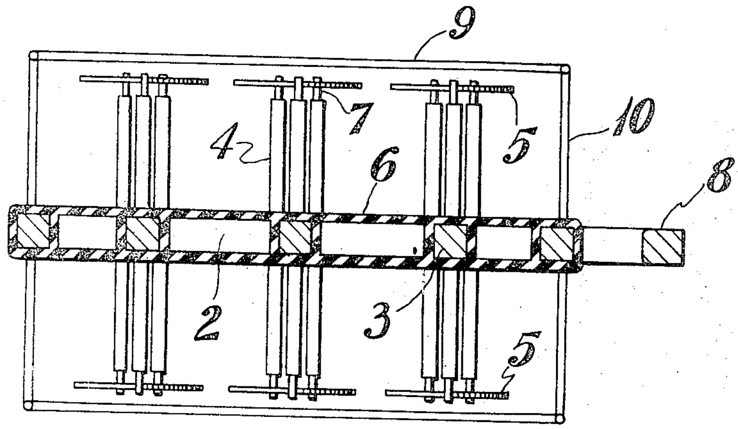
FIGURE 2 is a sectional view taken along the lines 2—2 of FIGURE 1.
Figure 3:
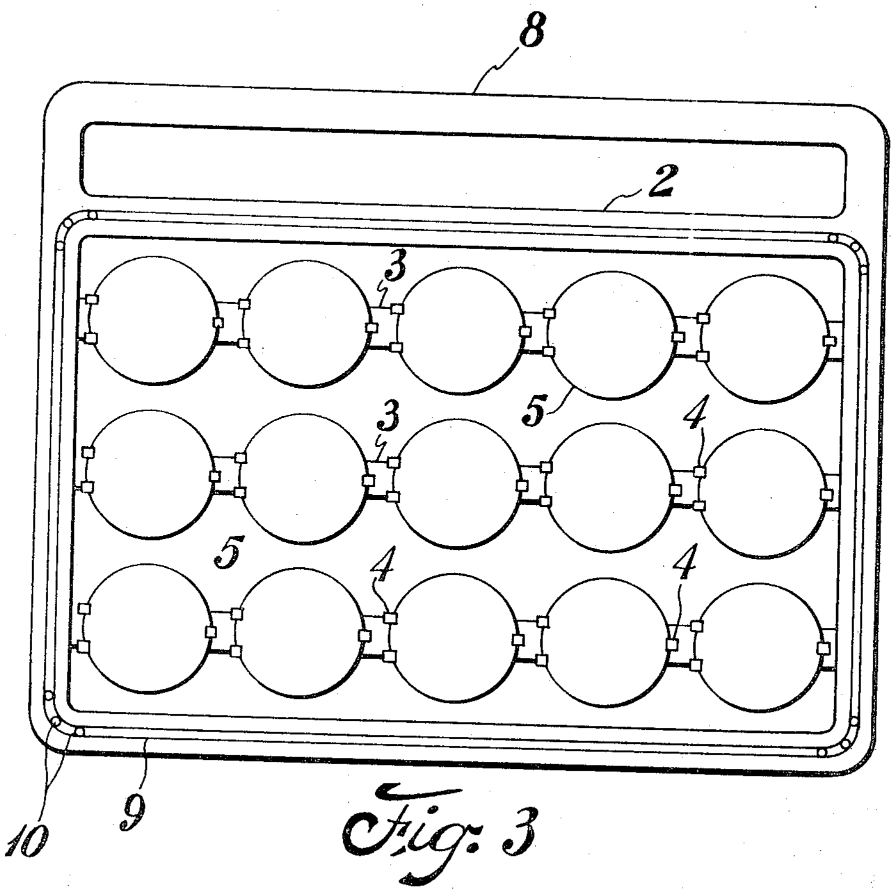
FIGURE 3 is a top view of FIGURE 2.

Referring now to the drawing wherein similar parts in the various figures have been assigned the same reference numerals, a holding fixture is designated generally by the numeral 1. The fixture 1 includes a frame 2 which is constructed of a high conductivity material, such, for example, as copper, phosphorus bronze or other materials having good conductivity. The frame 2 has a plurality of cross bars 3 upon which are secured wire contacts 4. The contacts 4 are arranged for three to make contact with each wafer 5 to be plated. The contacts 4 may be made from stainless steel and spring steel. At least one of the contacts 4 is located so as to provide a slight pressure on the wafer 5. The frame 2, including crossbars 3, is coated with a plastic or other suitable insulating material 6. Also the contacts 4 are covered with the insulating material 6 leaving an exposed section 7 where the contacts 4 are to make electrical connection to the wafers 5. A contact bar 8 is electrically and mechanically connected to the frame 2 and is adapted for connection to a suitable source of current.

A wire 9 may be supported on the frame 2 by post 10 to serve as a "thief." The wire 10 is connected electrically to the contact bar 8 and serves to minimize or eliminate any effects such as "feathering" or "treeing" of plating on the outer edge of the wafers. The post 10 is also covered with the insulating material 6.

By the utilization of the three point contact on the wafers, variations in the wafers will not affect the holding thereof. Further such an arrangement facilitates loading and unloading without damage to the wafers.

Although only one embodiment of the invention has been illustrated and described, various changes in the form and relative arrangement of the parts, which will now appear to those skilled in the art, may be made without departing from the scope of the invention.

We claim:

1. A fixture for holding semiconductor wafers for plating comprising a multisided frame generally defining a plane, said frame being of a material having good electrical conductivity, a plurality of groups of axially parallel resilient control wires secured to said frame and generally perpendicular to said plane, said groups including three wires providing a three-point contact for supporting each wafer substantially axially parallel to said frame, insulating means for insulating said frame and a portion of said contact wires, and means for connecting said frame to the negative side of a source of electrical current.

2. The combination as set forth in claim 1 and including a "wire thief" surrounding said frame and connected to said source of current thereby to eliminate "feathering."

3. The combination as set forth in claim 1 in which said frame is of phosphorus bronze.

4. A holding fixture for semiconductor wafers comprising a multisided frame generally defining a plane and of a material having good conductivity, said frame having a plurality of cross members, each of said cross members having a plurality of groups of axially parallel resilient control wires secured to said frame and generally perpendicular to said plane, said groups including three wires providing a three-point contact for supporting each wafer substantially axially parallel to said frame, insulating means covering said frame and a portion of said contact members, and a contact bar connected to said frame.

5. The combination as set forth in claim 4 in which said insulating material is a plastic.

6. The combination as set forth in claim 4 in which one of said contact members of each group provides a pressure to hold the wafer against the other two contact members.

7. A holding fixture for semiconductor wafers, comprising a multisided frame generally defining a plane and of a material having good conductivity, said frame having a plurality of cross members, a plurality of groups of axially parallel resilient control wires secured to said frame and generaly perpendicular to said plane, said groups including three wires providing a three-point contact for supporting each wafer substantially axially parallel to said frame, and having a section adjacent to the ends thereof for contacting a semiconductor wafer, means for insulating said frame and cross members and said contact members below said contact section, and a contact member connected to said frame.

8. The combination as set forth in claim 7 and including a wire supported on post on said frame and connected to said contact bar to serve as a "thief" to prevent "feathering" around the edge of the wafers when being plated.

References Cited

UNITED STATES PATENTS

| | | | |
|---|---|---|---|
| 2,258,391 | 10/1941 | Novitsky | 204—297 |
| 3,035,999 | 5/1962 | Sharon et al. | 204—297 |
| 3,259,563 | 7/1966 | Del Monica | 204—297 |

ROBERT K. MIHALEK, *Primary Examiner.*
D. R. JORDAN, *Assistant Examiner.*